United States Patent
Siegler (10) Patent No.: US 8,723,498 B2
(45) Date of Patent: May 13, 2014

(54) SYSTEMS AND METHODS OF INCREASING POWER MEASUREMENT ACCURACY FOR POWER FACTOR CORRECTION

(75) Inventor: John J. Siegler, Hockley, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 12/339,984

(22) Filed: Dec. 19, 2008

(65) Prior Publication Data

US 2010/0156377 A1   Jun. 24, 2010

(51) Int. Cl.
G05F 1/56   (2006.01)
G05F 1/565   (2006.01)
G05F 1/575   (2006.01)

(52) U.S. Cl.
USPC .............................. 323/284; 323/223; 363/89

(58) Field of Classification Search
USPC ................. 323/205, 207, 222, 223, 282, 284; 363/89
See application file for complete search history.

(56) References Cited

U.S. PATENT DOCUMENTS

| | | | |
|---|---|---|---|
| 4,683,529 A * | 7/1987 | Bucher, II | 363/44 |
| 5,349,254 A | 9/1994 | Sakarya | |
| 5,363,020 A * | 11/1994 | Chen et al. | 315/209 R |
| 5,764,039 A | 6/1998 | Choi et al. | |
| 5,903,138 A * | 5/1999 | Hwang et al. | 323/266 |
| 6,128,205 A | 10/2000 | Bernd et al. | |
| 6,178,104 B1 | 1/2001 | Choi | |
| 6,222,746 B1 * | 4/2001 | Kim | 363/89 |
| 6,259,614 B1 | 7/2001 | Ribarich et al. | |
| 6,775,160 B2 * | 8/2004 | Siri | 363/89 |
| 7,088,081 B2 * | 8/2006 | Takahashi et al. | 323/222 |
| 7,202,640 B2 | 4/2007 | Morita | |
| 7,375,995 B1 | 5/2008 | Cheng | |
| 7,453,248 B2 * | 11/2008 | Takeuchi | 323/285 |
| 2003/0202368 A1 * | 10/2003 | Ierymenko | 363/125 |
| 2007/0002595 A1 * | 1/2007 | Tzeng | 363/49 |
| 2008/0211471 A1 * | 9/2008 | Liao et al. | 323/282 |

* cited by examiner

Primary Examiner — Adolf Berhane
Assistant Examiner — Nusrat Quddus

(57) ABSTRACT

Systems and methods for increasing power measurement accuracy for power factor correction (PFC) are disclosed. An exemplary method may include providing a PFC circuit for a power supply, the PFC circuit having a bulk capacitor connected to a rectified AC line. The method may also include measuring output load. The method may also include enabling AC wave skipping if the measured output load drops below a threshold value.

17 Claims, 6 Drawing Sheets

SYSTEMS AND METHODS OF INCREASING POWER MEASUREMENT ACCURACY FOR POWER FACTOR CORRECTION

BACKGROUND

The power factor (PF) of an alternating current (AC) electric circuit is the ratio of real power to apparent power, and is expressed as a number between 0 and 1.0 (or as a percentage). Real power is the capacity of the circuit to perform work in a given time, and apparent power is the product of the current and voltage of the circuit. Various factors (e.g., a non-linear load, or the amount of energy stored in the load versus energy returned to the power source) can cause the apparent power to exceed the real power, increasing power losses through the utility company's electrical transmission and distribution lines. Utility companies may even charge higher rates to customers who do not maintain high power factors.

Accordingly, it is often desirable to adjust the power factor of an electronics system (e.g., a computer server or collection of servers such as a "server farm"). Power factor correction (PFC) circuits are available that bring the power factor of an AC circuit closer to 1.0. Typical PFC circuits operate by determining the PF and adjusting input current so that the current is in phase with the supply voltage. The PF can be determined by dividing the power (in Watts) by the product of measured voltage and current. Therefore, it is important for the voltage and current measurements to be accurate.

Sensing elements for measuring voltage and current in PFC circuits are generally sized to minimize power loss for the highest rated output power at the lowest rated input voltage. But when operating at the lowest rated output power at the highest rated input voltage, the voltage signal generated by the current sensing element can be very small, with a poor signal to noise ratio. The decreased accuracy in this measurement makes it more difficult, if not impossible, to maintain an optimal PF for variable loads (e.g., based on system design, operating conditions, etc.).

PFC circuits may be turned on and off randomly as needed to support the load, thereby saving energy. When randomly turning on and off the PFC circuit, however, PFC suffers and it is difficult if not impossible to accurately measure the current. It is also possible to increase the sense resistance, but this typically increases power loss and reduces operating efficiency. In addition, PFC and current measurement may improve, but again degrades at lower current levels.

BRIEF DESCRIPTION OF THE DRAWINGS

In order that the invention may be well understood, various embodiments thereof will now described, by way of example only, with reference to the accompanying drawings, in which:

FIG. 1 is a high-level illustration of resulting PF under load for an exemplary computer system, wherein (a) shows a plot with a lagging power factor (PF<1.0), (b) shows a plot with a PF at or near 1.0.

FIG. 3 is a high-level illustration of AC line wave skipping, wherein (a) shows a plot without AC line wave skipping, and (b) shows a plot after enabling AC line wave skipping.

DETAILED DESCRIPTION

Systems and methods described herein may be implemented in a power factor correction (PFC) circuit for increasing power measurement accuracy of a power supply. The PFC circuit may be provided for a power supply in an electronics system (e.g., one or more computer server or appliance). In an exemplary embodiment, the PFC circuit may be shut down 60 Hz rectified half sine wave input intervals (also referred to as "wave skipping"), thereby increasing efficiency, improving PFC and increasing power measurement accuracy of the power supply.

According to exemplary embodiments described herein, PFC wave skipping improves operating efficiencies, even at light loads. In addition, PFC wave skipping enables good PFC even at low operating power (e.g., even down to a zero load). PFC wave skipping also improves input measurement accuracy, which may be used to increase the power factor (PF) across a full operating range of the PFC circuit (e.g., below 200 W for a 1200 W power supply). There is also less AC line voltage distortion.

Exemplary System

Figure 1A:
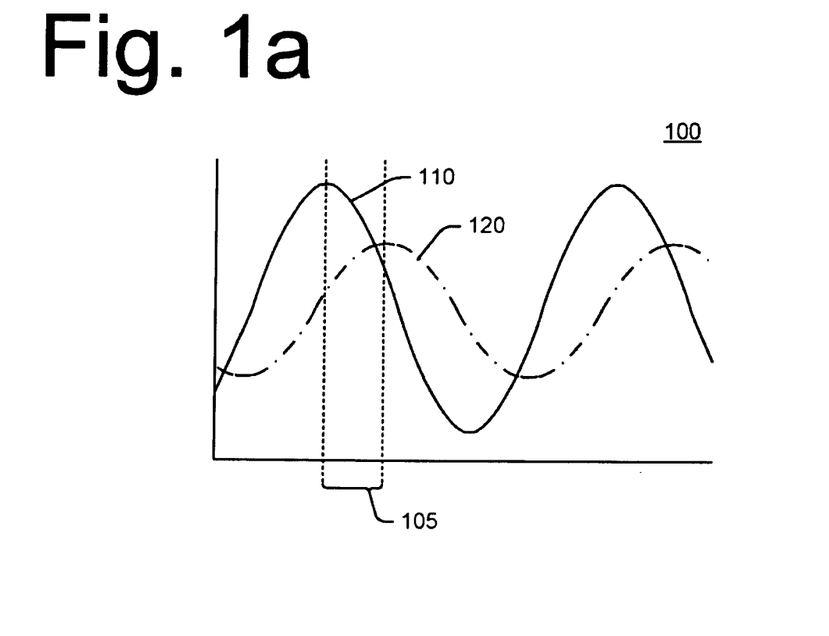
Figure 1B:
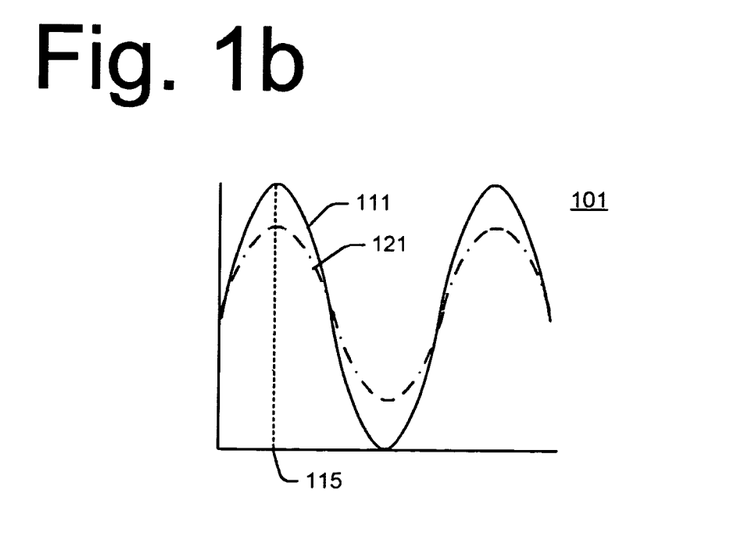

FIG. 1 is a high-level illustration of an exemplary computer system and the resulting PF under load, wherein (a) shows a plot 100 with a lagging power factor (PF<1.0), (b) shows a plot 101 with a PF at or near 1.0. The example shown in FIG. 1a corresponds to an electronics system (e.g., one or more server computers or appliance) without any PF correction. It can be seen from the example shown in plot 100 that the current waveform 110 lags the voltage waveform 120 by about 45 degrees (note the lag illustrated by bracket 105). As discussed above, operating under these conditions is undesirable for a number of reasons.

A PFC circuit (e.g., the PFC circuit 200 in FIG. 2) may be implemented in the electronics system, e.g., as part of the power supply electronics. The PFC circuit 200 functions to correct lag between the current signal 110 and the voltage signal 120 in order to approach or meet a PF of 1.0, as illustrated by the plot 101 in FIG. 1b. It is observed in the plot 101 that after correction the lag is much less (indeed, in FIG. 1b there is no lag as illustrated by reference 115) between current signal 111 and voltage signal 121.

Figure 2:
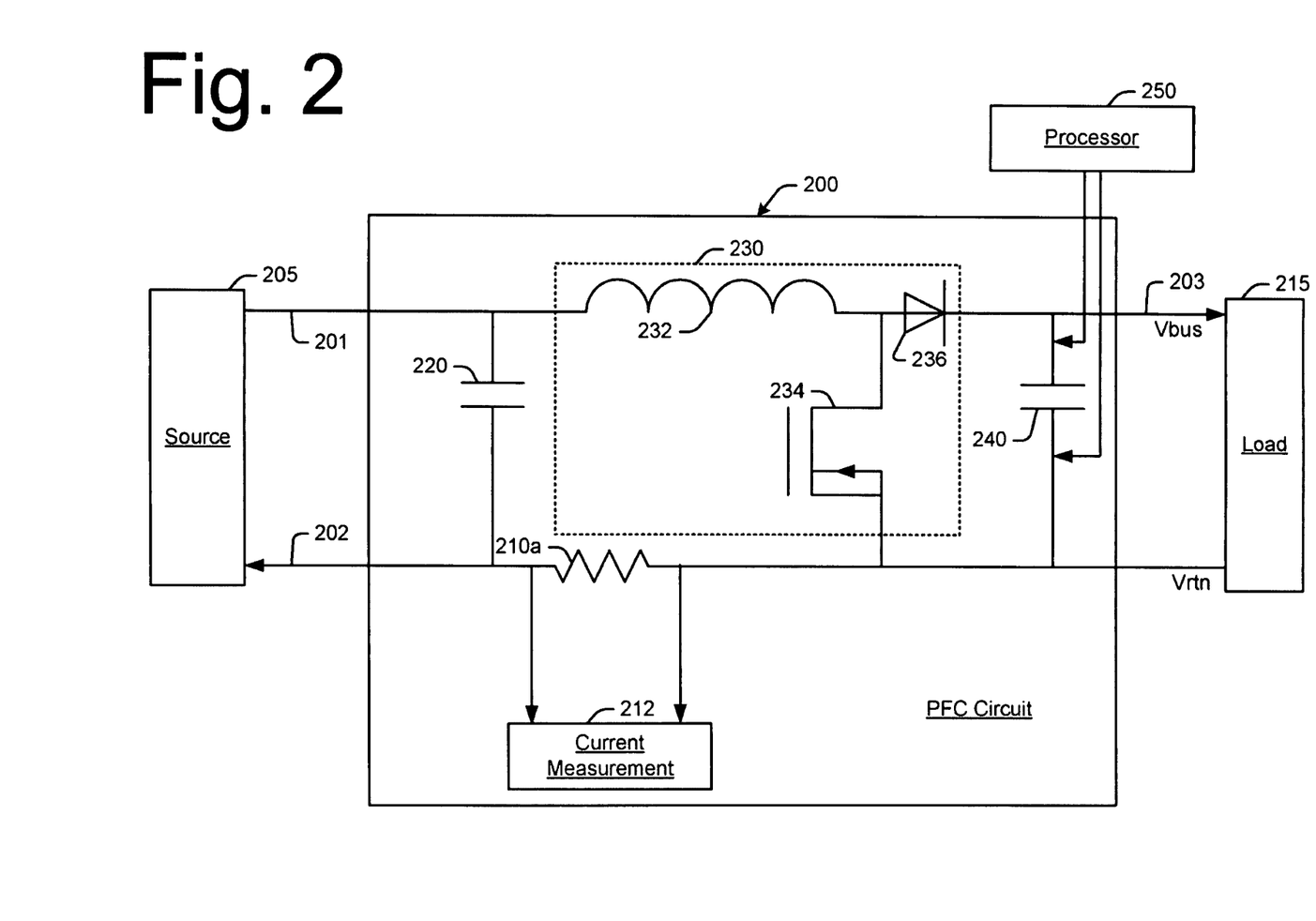
FIG. 2 is a schematic diagram illustrating an exemplary PFC circuit which may be implemented for increasing power measurement accuracy of a power supply.

In an exemplary embodiment, the PFC circuit 200 takes input AC voltage (e.g., about 100-240 VAC) and boosts the input AC voltage (e.g., to about 400 VAC), referred to as "bulk voltage" in a first stage. In a second stage, the PFC circuit 200 may take the bulk voltage stored in a bulk capacitor and converts the bulk voltage down to usable output voltages (e.g., 48V, 12V, or 5V). The energy stored in the bulk capacitor is sufficient to run the power supply for a minimum of about 10 ms at full output power, e.g., if AC power is lost, and much longer at light loads.

The PFC circuit 200 may correct lag by monitoring the input voltage rectified waveform and force the input current to follow a sine wave and be in phase with the input voltage waveform to cancel the inductive or capacitive effects of the load. The PF can be determined based on voltage and/or current measurements. Therefore, it is important for these measurements to be accurate. However, when the electronics system is drawing less current than the sensing element is sized for (e.g., drawing 1 Amp instead of 10 Amps), the signal may be too small for accurate measurements. Accordingly, it is desirable to increase the power measurement accuracy of the power supply.

FIG. 2 is a schematic diagram illustrating an exemplary PFC circuit 200 which may be implemented with a processing component 250 for increasing power measurement accuracy of a power supply. The PFC circuit 200 may include a current sensing resistor 210 connected on a return path 202 of a rectified AC line. The current sensing resistor 210 may be used for the current measurement.

In an exemplary embodiment, the current sensing resistor 210 may be sized for the lowest expected current (e.g., 1 Amp) to provide a larger signal sense. If the electronics system is drawing more current than the current sensing resistor 210 is sized for, the current signal may not be suitable for accurate measurements. Accordingly, when in wave skipping mode, the processing component 250 (e.g., a microprocessor executing firmware) may enable the PFC for a single or series of half waves when the bulk voltage decreases below a threshold value to maintain the signal level. Likewise, the processing component may disable AC line wave skipping if the bulk voltage increases back above the threshold value.

It is noted that any suitable threshold (or thresholds) may be implemented and may depend on various design considerations. For example, multiple threshold intervals may be implemented to switch on/off AC line wave skipping for different intervals. Exemplary design considerations may include, but are not limited to, the desired granularity and the desired ability for increasing power measurement accuracy of a power supply.

Exemplary PFC circuit 200 is shown in FIG. 2 as it may be implemented in hard-wired circuitry. However, it is noted that the circuit may also be implemented in other circuitry (e.g., logic gates) as will be readily apparent to those having ordinary skill in the art after becoming familiar with the teachings shown and described herein.

The PFC circuit 200 may be connected on lines 201, 202 between a bridge (not shown) to an AC power source 205 (e.g., an electrical outlet) and a load 215 (e.g., a server computer). The bridge provides a rectified AC signal which behaves as a "partial DC" signal. Bridges for providing a rectified AC signal are well known in the electronics arts, and generally operate by "flipping" the negative portion of the AC sine wave so that it is additive with the positive portion of the AC sin wave. Capacitor 220 serves as a high frequency filter element.

The PFC circuit 200 may include a boost converter 230 to provide a power supply "boost" to the load 215. An exemplary boost converter 230 may include an inductor 232 controlled by the field-effect transistor (FET) 234 and diode 236. The boost converter 230 boosts the voltage supplied on the voltage bus (Vbus) 203. A bulk capacitor 240 may be provided to hold the charge, as described above. The return bus (Vrtn) 202 provides a path back to the AC power source 205.

Boost converters such as the one just described are well-understood in the electronics arts, and the specific components called out above are merely illustrative of one type of boost converter which may be implemented. Other types of boost converters may also be used, as will be readily understood by those having ordinary skill in the art after becoming familiar with the teachings herein.

The current sensing resistor 210 is connected in-line on the return bus 202, and may be selected or sized for a minimum expected load (e.g., 1 Amp). The output from the current sensing resistor 210 may be used for the boost converter 230 (e.g., as a current measurement 212) to control output the desired level of PF correction via FET 234.

In operation, when the load decreases below a threshold value, the processing component 250 enables AC line wave skipping for accurate measurements. The processing component 250 may enable AC line wave skipping by turning on/off the boost converter 230. For example, the processing component 250 may turn on the boost converter 230 for one-half AC cycle, and then turn off the boost converter 230 for ten half AC cycles. When the load increases, processing component 250 may switch off AC line wave skipping. Note that the current during the "on" period of AC wave skipping is enough to supply the output with energy during the "off" periods. For example, when the PFC is running at a 1 amp input current without wave skipping, wave skipping may operate by drawing 10 amps for one half cycle and then remain off for 9 cycles. The RMS power an current is the same for both scenarios, but the PFC and current measurement accuracy during the 10 amp half cycle is much better than during the ten, 1 amp cycles.

Of course any suitable wave-skipping may be implemented. For purposes of illustration only, at 1% of load, wave skipping may include turning on the boost converter 230 every 1 out of 20 half AC cycles; at 2% of load, wave skipping may include turning on the boost converter 230 every 1 out of 15 half AC cycles; and so forth. Power savings would be dependent on a number of factors including duty cycle of wave skipping, circuit topology and components used. The power being saved is the power used to turn the PFC FET(s) off and on and will depend on all the previous mentioned factors. Design considerations may include how fast the bulk capacitor is bleeding off, and/or how fast the boost converter 230 can be turned on/off, and/or how fast the bulk capacitor charge can be restored.

Figure 3A:
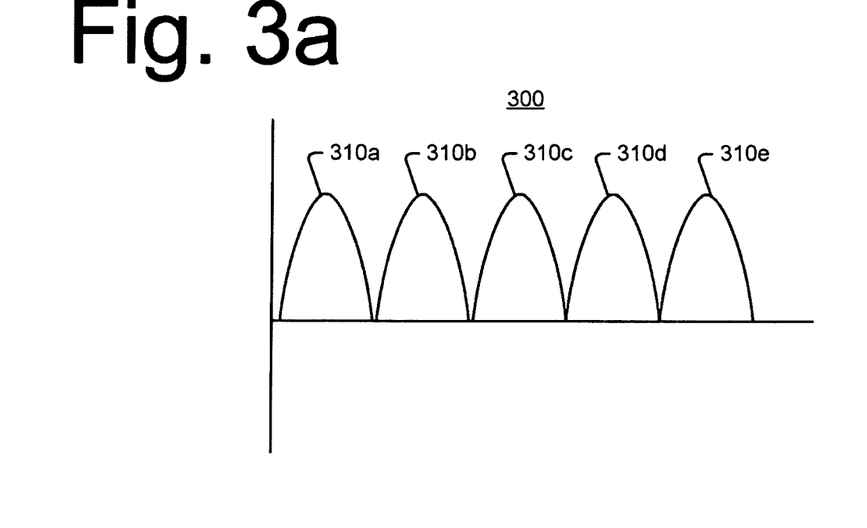
Figure 3B:
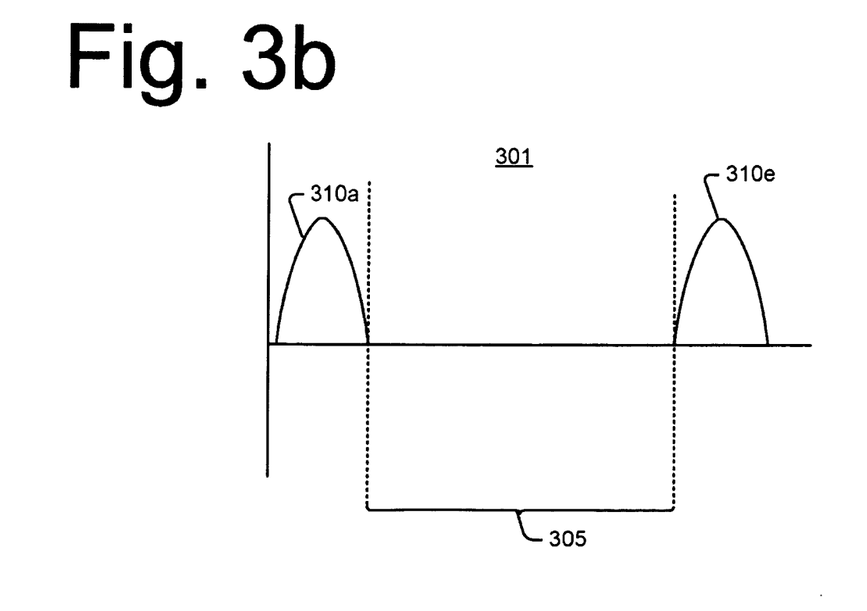

The following example is provided to illustrate wave skipping. In this example, a power supply may be designed to run between about 360 to 410 VDC. If the maximum input current is 10 Amps for the power supply and the input current drops below 3 Amps, the processing component 250 may enable wave skipping mode (e.g., compare FIG. 3a to FIG. 3b). FIG. 3 is a high-level illustration of AC line wave skipping, wherein (a) shows a plot 300 without AC line wave skipping (e.g., half sine waves 310a-e are shown), and (b) shows a plot 301 after enabling AC line wave skipping, as illustrated between bracket 305. Note that the y axis is AC input current and the x axis is time.

In this illustration, when AC line wave skipping is enabled, the PFC circuit 200 is set for about 10 A, and turned on for one-half cycle and then disabled. The bulk voltage is monitored by the processing component 250. When the bulk voltage drops to about 380 VDC, the PFC circuit 200 is enabled for another half wave cycle. This process continues until the bulk voltage returns to about 400 VDC where the cycle begins again.

During each half cycle, current measurement is very accurate because the current is in the range of good accuracy, and thus PFC is very good. It is also noted that very little power is used while the PFC circuit is disabled. The PFC power draw can be lower than about 1% of that which it would otherwise be operating continuously at light loads.

It is noted that other control techniques may also be implemented by the processing component 250 to improve operation. For example, the processing component 250 may monitor the slope of the bulk voltage going down, and use this measurement as an indication to disable wave skipping mode.

Before continuing, it is noted that the PFC circuit 200 may be configured at run-time in order to be based on operational data for the circuit. Also in exemplary embodiments, the configuration may be maintained during operation. Accordingly, the circuit is adaptable and may be reconfigured, e.g., based on changes in the run-time environment.

It is also noted that the systems and methods described herein do not need to be implemented in any particular circuit design. The circuit design described with reference to FIG. 2 is provided merely as exemplary of one embodiment of a circuit. It is contemplated that those having ordinary skill in the art, after becoming familiar with the teachings herein, will be able to provide other circuit designs for increasing power measurement accuracy of a power supply for power factor correction.

Exemplary Operations

Figure 4:
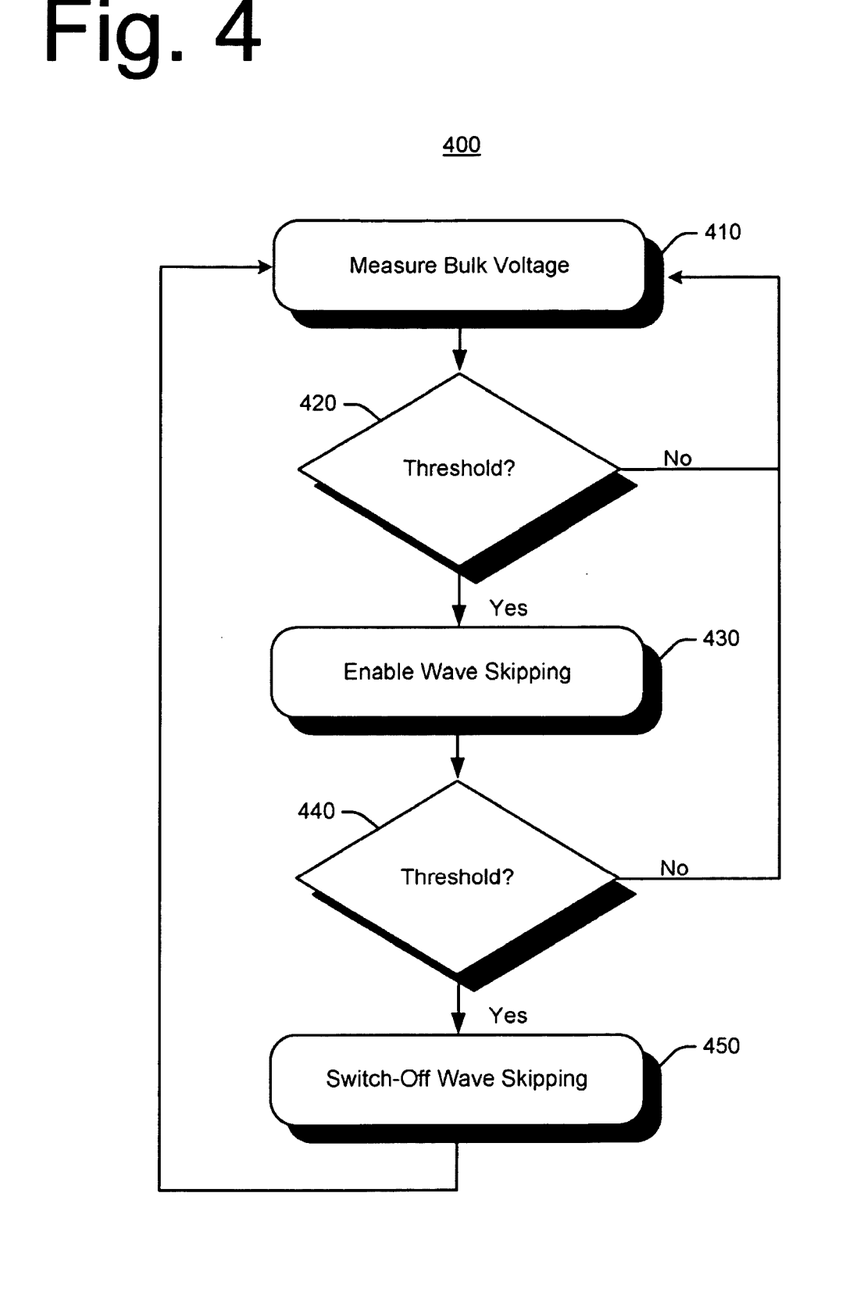
FIG. 4 is a flowchart illustrating exemplary operations for increasing power measurement accuracy of a power supply.

FIG. 4 is a flowchart illustrating exemplary operations 400 for increasing power measurement accuracy of a power supply. Exemplary operations also improve efficiency and Power Factor (PF). In an exemplary embodiment, the components and connections depicted in the figures may be used. It is also contemplated that in other embodiments, operations shown and described herein may be implemented in other circuitry, logic components, and/or control logic such as a processor or processing units.

In operation 410, bulk voltage may be measured on a line-in for a load. In operation 420, a determination is made whether the output load is at a level where wave skipping is advantageous. This can be determined by any or all, but not limited to, past load history, rate of change of bulk level, output current measurement, etc. If the determination is yes, then the power supply enters wave skipping mode in operation 430.

In operation 440, another determination is made whether to activate an individual half cycle during the wave skipping operation. In operation 450, the AC line wave skipping may be disabled again.

The operations shown and described herein are provided to illustrate exemplary implementations for increasing power measurement accuracy of a power supply for power factor correction. Still other operations may also be implemented. Specific exemplary implementations are described below for purposes of illustration with reference to the flow charts shown in FIGS. 5 and 6.

Figure 5:
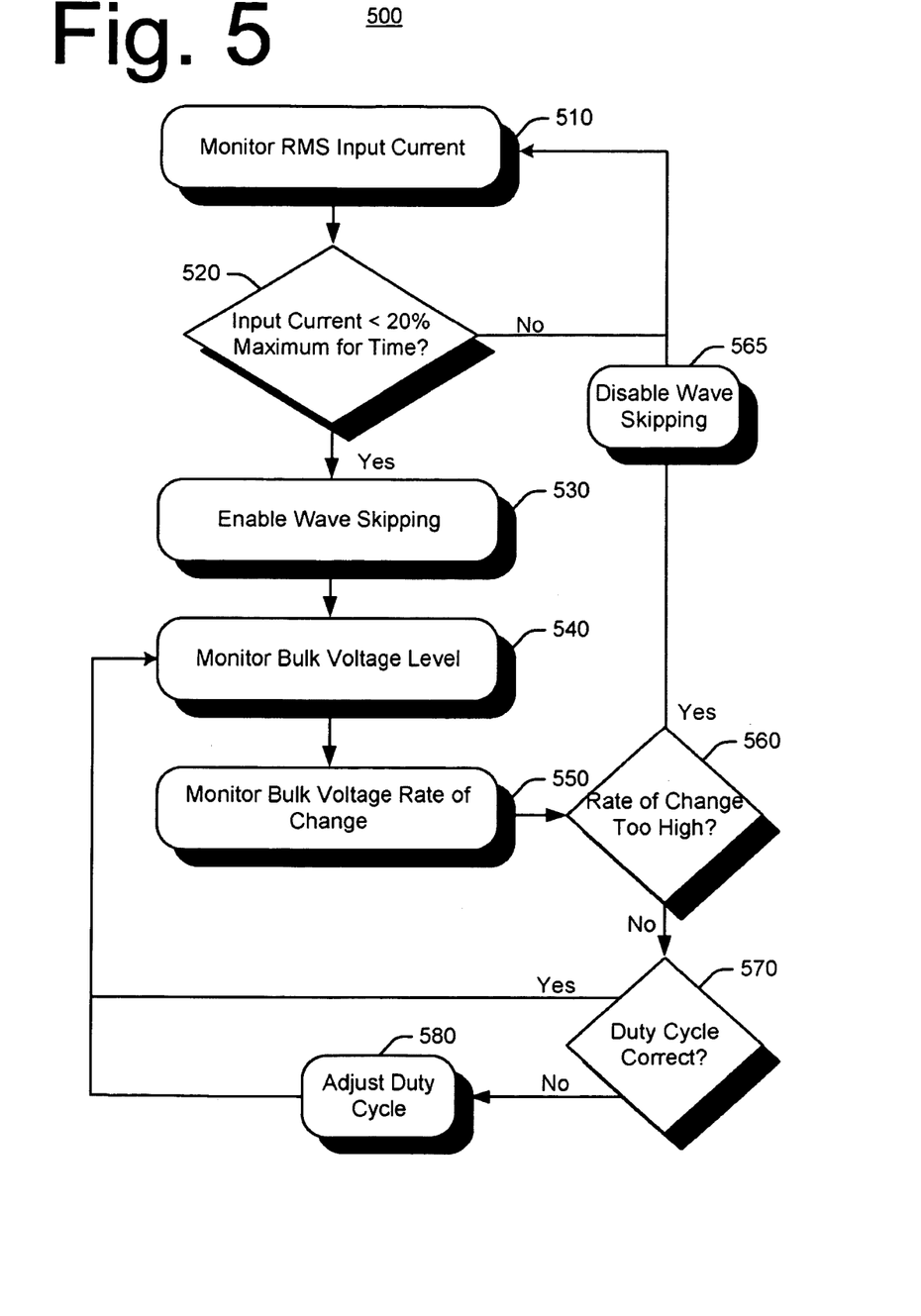
FIG. 5 is a flowchart of a specific exemplary implementation for increasing power measurement accuracy of a power supply.

FIG. 5 is a flowchart of a specific exemplary implementation 500 for increasing power measurement accuracy of a power supply. Exemplary operations also improve efficiency and Power Factor (PF). In this example, a 60 hertz (Hz) duty cycle adjustment method is implemented. The duty cycle of the wave-skipping is adjusted to meet the demands of the load. Duty cycle is defined as the ratio of half wave cycles the PFC is on, to total half wave cycles. For example, a 10% duty cycle is one half wave PFC is enabled followed by nine half waves being disabled.

In operation 510, the RMS input current may be monitored. Monitoring RMS input current is one way of detecting load level. Other methods may also be used, e.g., monitoring primary transformer current or secondary current monitoring.

In operation 520, a determination is made whether the input current is below about 20% the maximum input current for a predetermined time. Current load levels, dwell times at current levels, and load level history may be used for the decision whether to enter wave-skipping mode. Of course the determination may be different depending on the application circuit topology.

If the input current is not below the 20% cutoff, monitoring RMS input current continues in operation 510. Otherwise, wave-skipping mode is enabled in operation 530; the bulk voltage level is monitored in operation 540, and the rate of change of the bulk voltage is monitored in operation 550.

In operation 560, a determination is made whether the rate of change of the bulk voltage monitored in operation 550 is too high for wave-skipping mode. If the rate of change is too high, then wave-skipping mode may be disabled in operation 565, and operations continue to monitor RMS input current in operation 510. The determination in operation 560 may be based on the load. It is noted that a high step load may require immediate return to normal PFC. Indeed, some situations may require return to PFC even during a half wave, depending on the circuit design and application.

Otherwise, another determination is made in operation 570 whether the wave-skipping duty cycle is correct for the load. The determination in operation 570 may be implemented in software (or hardware), and may be made on a combination of factors, such as, but not limited to, the rate of change of the bulk voltage, bulk voltage level, previous measurements, trend over time, bulk capacitance, hold-up time, etc. If the duty cycle is correct for the load, then operations continue by monitoring bulk voltage levels in operation 540. Otherwise, the duty cycle may be adjusted in operation 580 before continuing to monitor the bulk voltage levels in operation 540.

Figure 6:
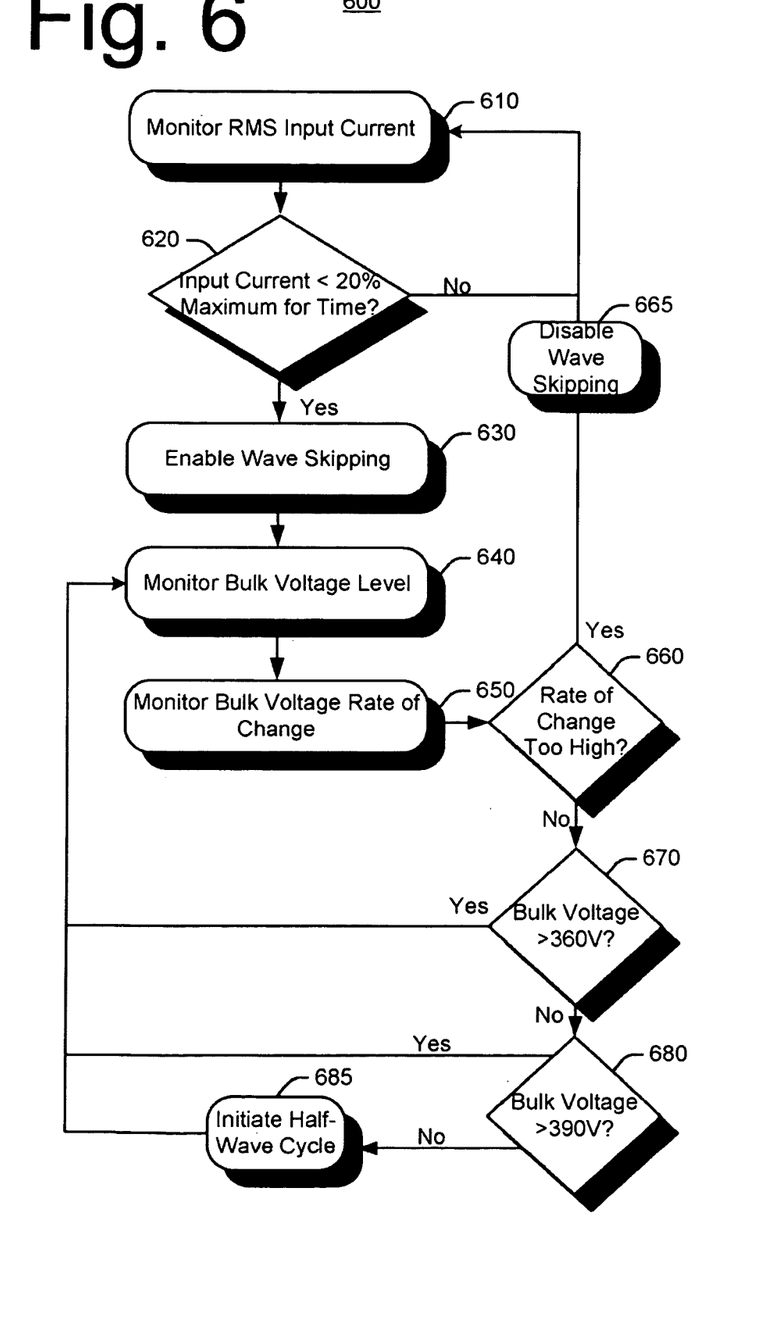
FIG. 6 is a flowchart of another specific exemplary implementation for increasing power measurement accuracy of a power supply.

FIG. 6 is a flowchart of another specific exemplary implementation 600 for increasing power measurement accuracy of a power supply. Exemplary operations also improve efficiency and Power Factor (PF). In this example, a 60 Hz "cycle on demand" method is implemented. The half cycle is initiated when needed due to requirements of the load.

In operation 610, the RMS input current may be monitored. Monitoring RMS input current is one way of detecting load level. Other methods may also be used, e.g., monitoring primary transformer current or secondary current monitoring.

In operation 620, a determination is made whether the input current is below about 20% the maximum input current for a predetermined time. Current load levels, dwell times at current levels, and load level history may be used for the decision whether to enter wave-skipping mode. Of course the determination may be different depending on the application circuit topology.

If the input current is not below the 20% cutoff, monitoring RMS input current continues in operation 610. Otherwise, wave-skipping mode is enabled in operation 630, the bulk voltage level is monitored in operation 640, and the rate of change of the bulk voltage is monitored in operation 650.

In operation 660, a determination is made whether the rate of change of the bulk voltage monitored in operation 650 is too high for wave-skipping mode. If the rate of change is too high, then wave-skipping mode may be disabled in operation 665, and operations continue to monitor RMS input current in operation 610.

Otherwise, another determination is made in operation 670 whether the bulk voltage from operation 640 exceeds about 360 volts. If the bulk voltage exceeds about 360 volts, then monitoring bulk voltage level continues in operation 640. Otherwise, yet another determination is made in operation 680 whether the bulk voltage is greater than about 390 volts. If the bulk voltage is greater than about 390 volts, then monitoring bulk voltage level continues in operation 640. Otherwise, half-wave cycles may be initiated in operation 685 before monitoring bulk voltage level continues in operation 640.

In addition to the specific embodiments explicitly set forth herein, other aspects will be apparent to those skilled in the art from consideration of the specification disclosed herein. It is intended that the specification and illustrated embodiments be considered as examples only, with a true scope and spirit of the following claims.

The invention claimed is:

1. A method for increasing power measurement accuracy for power factor correction (PFC) in a PFC circuit for a power supply, the PFC circuit having a bulk capacitor connected to a rectified AC line, the method comprising:
   measuring output load; and
   enabling AC wave skipping if the output load drops below a threshold value wherein enabling AC wave skipping is variable and includes turning on the PFC circuit for one half AC cycle and then disabling the PFC circuit for at least one half AC cycle.

2. The method of claim 1, further comprising disabling AC wave skipping if the output load increases above the threshold value and wherein enabling AC wave skipping improves current measurement accuracy for a low amplitude current signal.

3. The method of claim 1, wherein enabling AC wave skipping reduces power consumption by the power supply for a predetermined load.

4. The method of claim 1, wherein the threshold is about 3 Amps.

5. A system for increasing power measurement accuracy for power factor correction (PFC), comprising:
   a power supply;
   a PFC circuit connected to the power supply, the PFC circuit having a bulk capacitor connected to a rectified AC line of the power supply;
   a processing component configured to output load, and the processing component configured to enable AC wave skipping when the measured output load drops below a threshold value wherein enabling AC wave skipping is variable and includes turning on the PFC circuit for one half AC cycle and then disabling the PFC circuit for at least one half AC cycle.

6. The system of claim 5, wherein the processing component is further configured to disable AC wave skipping when the output load increases above the threshold value.

7. The system of claim 5, wherein the processing component is configured to enable variable AC wave skipping depending on load.

8. The system of claim 5, wherein the processing component is configured:
   to turn on the boost converter for one half AC cycle and then turn off the boost converter for twenty half AC cycles at 1% of load; and
   to turn on the boost converter for one half AC cycle and then turn off the boost converter for fifteen half AC cycles at 2% of load.

9. A system for increasing power measurement accuracy for power factor correction (PFC), comprising:
   means for power factor correction of a power supply;
   means for measuring output load; and
   means for enabling AC wave skipping if the measured output load drops below a threshold value wherein enabling AC wave skipping is variable and includes turning on the PFC circuit for one half AC cycle and then disabling the PFC circuit for at least one half AC cycle.

10. The system of claim 9, further comprising means for disabling AC wave skipping when the measured output load returns above the threshold value.

11. The system of claim 9, further comprising means for comparing the measured bulk voltage to the threshold value.

12. The method of claim 1, wherein AC wave skipping comprises enabling-disabling the PFC circuit for as long as the measured output load remains below the threshold value.

13. The method of claim 1, further comprising enabling the PFC circuit for only one-half cycle, then disabling the PFC circuit even if the measured output load is below the threshold value, and then repeating enabling-disabling the PFC circuit for as long as the measured output load remains below the threshold value.

14. The method of claim 1, further comprising measuring slope of the bulk voltage going down and using the measurement to disable an AC wave skipping mode.

15. The system of claim 5, wherein the processing component enables AC wave skipping by repeatedly turning on and off a boost converter in the PFC circuit at half sine wave intervals for as long as the measured output load remains below the threshold value.

16. The system of claim 5, wherein enabling AC wave skipping is on an alternating duty cycle for as long as the measured output load remains below the threshold value, the duty cycle configured to increase power measurement accuracy.

17. The system of claim 15, wherein current supplied during an "on" portion of the AC wave skipping duty cycle is sufficient to supply energy during an "off" portion of the AC wave skipping duty cycle.

* * * * *

UNITED STATES PATENT AND TRADEMARK OFFICE
CERTIFICATE OF CORRECTION

PATENT NO. : 8,723,498 B2
APPLICATION NO. : 12/339984
DATED : May 13, 2014
INVENTOR(S) : John J. Siegler Page 1 of 1

It is certified that error appears in the above-identified patent and that said Letters Patent is hereby corrected as shown below:

In the Claims,

In column 7, line 8, in Claim 1, delete "value" and insert -- value; --, therefor.

In column 7, line 31, in Claim 5, delete "value" and insert -- value; --, therefor.

In column 8, line 9, in Claim 9, delete "value" and insert -- value; --, therefor.

Signed and Sealed this
Ninth Day of September, 2014

Michelle K. Lee
*Deputy Director of the United States Patent and Trademark Office*